(12) United States Patent
Healy

(10) Patent No.: US 11,461,468 B2
(45) Date of Patent: Oct. 4, 2022

(54) VISUAL IDENTIFICATION OF MALWARE

(71) Applicant: McAfee, LLC, San Jose, CA (US)

(72) Inventor: Sorcha Bairbre Healy, County Cork (IE)

(73) Assignee: McAfee, LLC, San Jose, CA (US)

( * ) Notice: Subject to any disclaimer, the term of this patent is extended or adjusted under 35 U.S.C. 154(b) by 404 days.

(21) Appl. No.: 16/675,352

(22) Filed: Nov. 6, 2019

(65) Prior Publication Data

US 2021/0133322 A1 May 6, 2021

(51) Int. Cl.
*G06F 21/56* (2013.01)
*G06N 20/00* (2019.01)
*G06K 9/62* (2022.01)
*G06T 11/00* (2006.01)

(52) U.S. Cl.
CPC ......... *G06F 21/565* (2013.01); *G06K 9/6215* (2013.01); *G06K 9/6267* (2013.01); *G06N 20/00* (2019.01); *G06T 11/001* (2013.01); *G06F 2221/034* (2013.01)

(58) Field of Classification Search
CPC .......... G06F 21/565; G06F 21/564; G06F 2221/034; G06K 9/6215; G06K 9/6267; G06K 9/6201; G06K 9/6272; G06N 20/00; G06N 3/08; G06T 11/001; G06V 10/82

See application file for complete search history.

(56) References Cited

U.S. PATENT DOCUMENTS

| | | | |
|---|---|---|---|
| 9,672,358 B1* | 6/2017 | Long | G06F 21/565 |
| 10,437,999 B1* | 10/2019 | Bhattacharyya | G06F 16/13 |
| 2018/0183815 A1* | 6/2018 | Enfinger | H04L 63/145 |

OTHER PUBLICATIONS

Han K, Lim JH, Im EG. Malware analysis method using visualization of binary files. In Proceedings of the 2013 Research in Adaptive and Convergent Systems Oct. 1, 2013 (pp. 317-321). (Year: 2013).*
Han K, Kang B, Im EG. Malware analysis using visualized image matrices. The Scientific World Journal. Jul. 16, 2014; 2014. (Year: 2014).*
Shaid SZ, Maarof MA. Malware behavior image for malware variant identification. In 2014 International Symposium on Biometrics and Security Technologies (ISBAST) Aug. 26, 2014 (pp. 238-243). IEEE. (Year: 2014).*

(Continued)

*Primary Examiner* — Robert B Leung
(74) *Attorney, Agent, or Firm* — Patent Capital Group

(57) ABSTRACT

There is disclosed in one example a computing apparatus, including: a hardware platform including a processor and a memory; and instructions encoded within the memory to instruct the processor to: receive an unknown file object; select the unknown file object for visual analysis; compute first, second, and third property sets for the unknown object; and construct an n×m bitmap of pixels, including comparing the unknown file object to n×m known file objects, wherein the pixels include first, second, and third color channels, wherein the first, second, and third color channels represent similarity of the first, second, and third properties to corresponding first, second, and third properties of a known file object from among the n×m file objects.

20 Claims, 9 Drawing Sheets

(56) References Cited

OTHER PUBLICATIONS

Nataraj L, Karthikeyan S, Jacob G, Manjunath BS. Malware images: visualization and automatic classification. In Proceedings of the 8th international symposium on visualization for cyber security Jul. 20, 2011 (pp. 1-7). (Year: 2011).*

Fu J, Xue J, Wang Y, Liu Z, Shan C. Malware visualization for fine-grained classification. IEEE Access. Feb. 12, 2018; 6:14510-23. (Year: 2018).*

Singh A, Handa A, Kumar N, Shukla SK. Malware classification using image representation. In International Symposium on Cyber Security Cryptography and Machine Learning Jun. 27, 2019 (pp. 75-92). Springer, Cham. (Year: 2019).*

Irina B. Stavros S. Nicholas K. A Novel Malware Detection System Based on Machine Learning and Binary Visualization. 2019 IEEE International Conference on Communications, May 20-24, 2019. (Year: 2019).*

* cited by examiner

VISUAL IDENTIFICATION OF MALWARE

FIELD OF THE SPECIFICATION

This application relates in general to computer security, and more particularly, though not exclusively, to providing a system and method for visual identification of malware.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
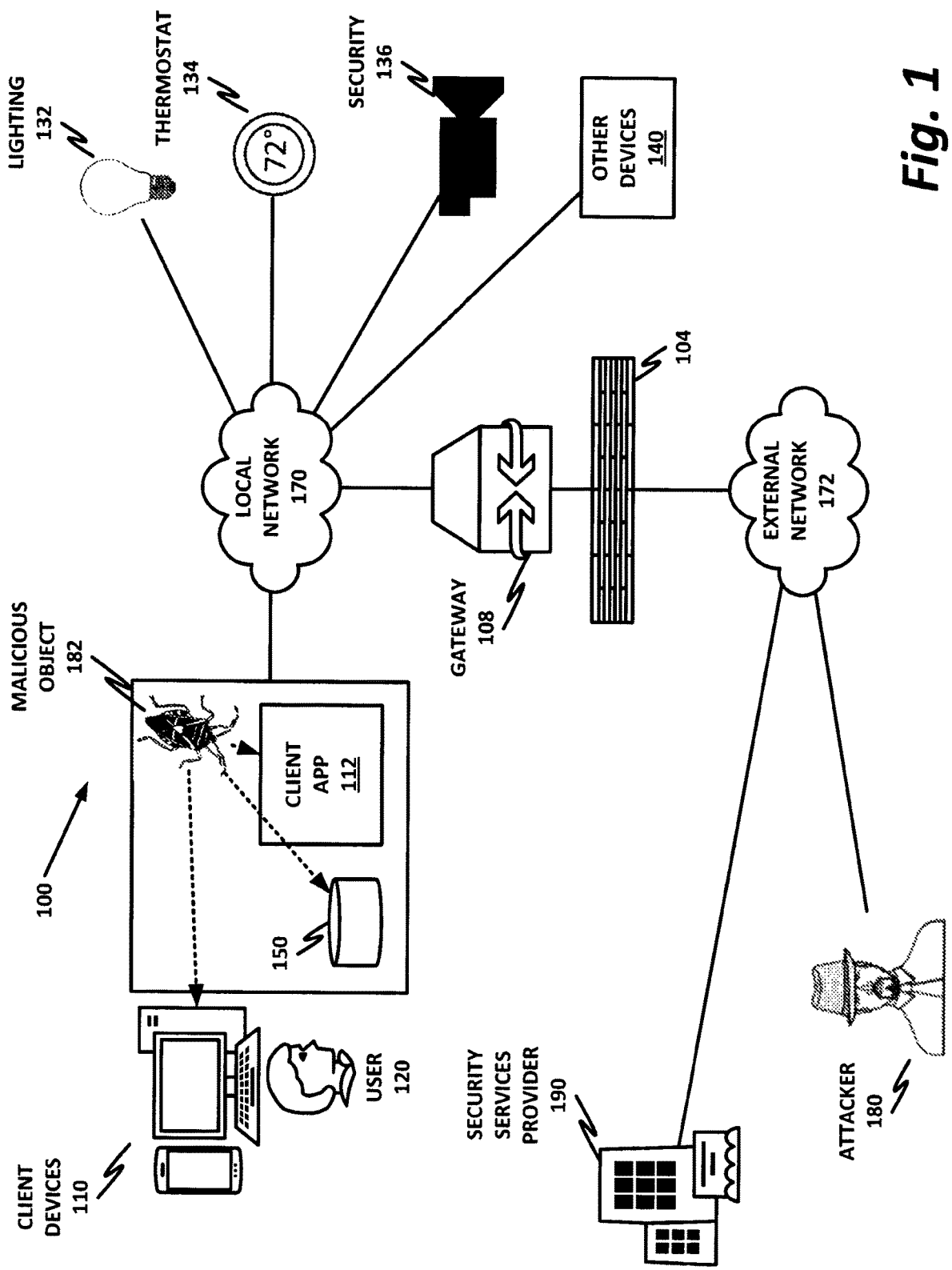
FIG. 1 is a block diagram illustrating selected elements of a security ecosystem.

In an example, there is disclosed a computing apparatus, comprising: a hardware platform comprising a processor and a memory; and instructions encoded within the memory to instruct the processor to: receive an unknown file object; select the unknown file object for visual analysis; compute first, second, and third property sets for the unknown object; and construct an n×m bitmap of pixels, comprising comparing the unknown file object to n×m known file objects, wherein the pixels include first, second, and third color channels, wherein the first, second, and third color channels represent similarity of the first, second, and third properties to corresponding first, second, and third properties of a known file object from among the n×m file objects.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Early generations of malware were relatively straightforward Trojans, worms, or malicious executables that would install themselves on end-user devices through various mechanisms. Early antivirus efforts focused at least in part on identifying these known threats by a signature or a hash. Essentially, a large database was maintained of hashes or signatures of known malware. A security agent running on a protected device would then scan incoming files to see if there was a match to any of the hashes or signatures of the known malware. If there was a match, then the incoming file was detected as malware. If there was not a match, some secondary analysis may have been performed.

As malware has evolved, detection has become more difficult. This has led to an arms race of sorts, with security services providers delivering ever more capable malware scanners, and malware authors reacting with workarounds to defeat those malware scanners. The use of packers, cross compilers, and other obfuscation techniques has made the classical hashing approach essentially meaningless for all but the simplest or most naïve malware packages. Furthermore, the delivery of advanced persistent threats (APTs), fileless malware, portable executables, and other relatively new techniques has made malware more difficult to detect with even some sophisticated secondary detection techniques.

But it is still true that the majority of malware shares certain characteristics. Like a developer of a useful program, most malware authors are not anxious to "reinvent the wheel." There are a number of well-known malware toolkits and application program interfaces (APIs) that are popular for malware authors. Thus, if an author is developing even a specifically customized piece of new malware, the malware object may still share certain characteristics with other malicious objects. This may be true even though the objects have different binary signatures or hashes. If a malware author uses one of these popular toolkits to develop his malicious code, regardless of his compiler, compile environment, time of compilation, file size, or other factors, the object may still bear traces of the malware toolkit.

Furthermore, even if a malware author does "reinvent the wheel" and decides not to use existing malware toolkits, the malicious code may still include a number of behavioral artifacts that are common to malware. Unless the malware author has discovered a completely new approach to performing malicious action that is previously unknown, the executable will essentially behave like malware, even if it doesn't use a malware toolkit.

Thus, on an abstract level, even if a malware object does not have the exact signature of a known malware object, and even if it does not use an exact known malware API, the object may nevertheless be expected to "look" like malware at a relatively rough level of abstraction.

Advances in machine learning have made relatively sophisticated computer vision techniques possible. For example, a machine learning model may be trained on hundreds, thousands, or more images of cats. Once the model has been trained, it can be exposed to a computer image such as a bitmap, and can scan the bitmap to determine whether it includes a cat. Indeed, very sophisticated computer vision systems such as the StyleGAN neural network cannot only recognize human faces, but even create photorealistic human faces from the trained data set.

So, if a computer vision system or other machine learning model can be trained on a large stack of images of malware, then if it is exposed to an image of a new, unknown object, the system may be able to determine with relatively high confidence whether the object is malware. It is therefore desirable to provide a system and method for representing objects as images.

It is possible to represent a binary large object (BLOB) as a simple bitmap representation. However, simply treating a large binary object as a bitmap generally produces substantial noise, and often conceals similarities between files. Thus, when representing a new incoming object as an image, it is advantageous to reduce it to a feature set, and to compare that feature set to a known feature set from known files with known reputations. Various features can then be divided into red, green, and blue channels in a pixel. For example, groups of features may be compared to the same features from a known malware object. These features can be grouped into red features (in a red channel), green features (in a green channel), and blue features (in a blue channel). The more closely the red features match, the higher the red value will be. This may be represented, in one example, as an integer between 0 and 255. If the red features have no correlation, then the red channel is assigned 0. If the red features have exact correlation, the red channel is assigned the integer value 255. For levels of similarity in between, a value between 0 and 255 is assigned. The same may be done for green and blue features.

In an illustrative embodiment, a bitmap of size 128×128 can be produced by comparing an object under analysis to $128^2$ (16,384) known malware images. In this example, the red channel is a measure of raw code similarity or overlap (e.g., "ssdeep"). For example, the red channel may receive a relatively high value if two objects share large swaths of identical byte code. However, the presence of identical byte code is not necessarily dispositive of the question of whether the object is malware. For example, two objects may have large swaths of identical byte code because they both include the C standard library. The use of the C standard library is not, by itself, indicative of malicious intent.

Thus, a green channel may also be computed. In this example, the green channel is a weighted extract of static features of the file.

Finally, the blue channel in this example is a model of the behavior and process of the file in execution.

Each channel is assigned a value between 0 and 255, thereby forming an RGB tuple that can be used to color a single pixel in the bitmap. By comparing the object under analysis to $128^2$ (16,384) known malware objects, a grid of 128×128 pixels can be produced, each having its own RGB tuple.

This process yields a bitmap of approximately 50 kB ($128^2$ pixels, with each pixel having a 3-byte RGB tuple). This yields a picture of the object, not as a raw byte stream, but rather a picture of how similar the object is to other known malware objects.

The picture, thus derived, can then be examined by a machine learning model or a computer vision system that has been trained on similar pictures of a large number of malware objects that have been compared to one another. Because this machine learning model has been trained on a large data set of known malware, it knows what malware objects "look like." Thus, the machine learning model can look at the picture, and just as it can tell a cat from a person with a high degree of confidence, it will be able to tell a malicious file from a benign file with a high degree of confidence.

A system and method for providing visual identification of malware will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram illustrating a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar. Client device 110 may include, as one of its client applications 112, a security agent. The security agent may be designed to detect on encountering a known malicious object. However, it is also desirable to provide malware remediation for newly encountered objects. Thus, security services provider 190 may include server class computers that perform additional analysis on newly encountered objects within an enterprise. These could be computers in a data center, such as virtual machines, containers, or other types of hardware and/or software platforms.

In some examples, work may be performed on a high performance computing (HPC) cluster, or on some similar architecture. Some analysis may be aided by accelerators, and particularly by GPUs that may provide some of the machine learning algorithms. In some cases, the machine learning algorithms are imported as libraries into a Python script, and Python is used for the individual analysis.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
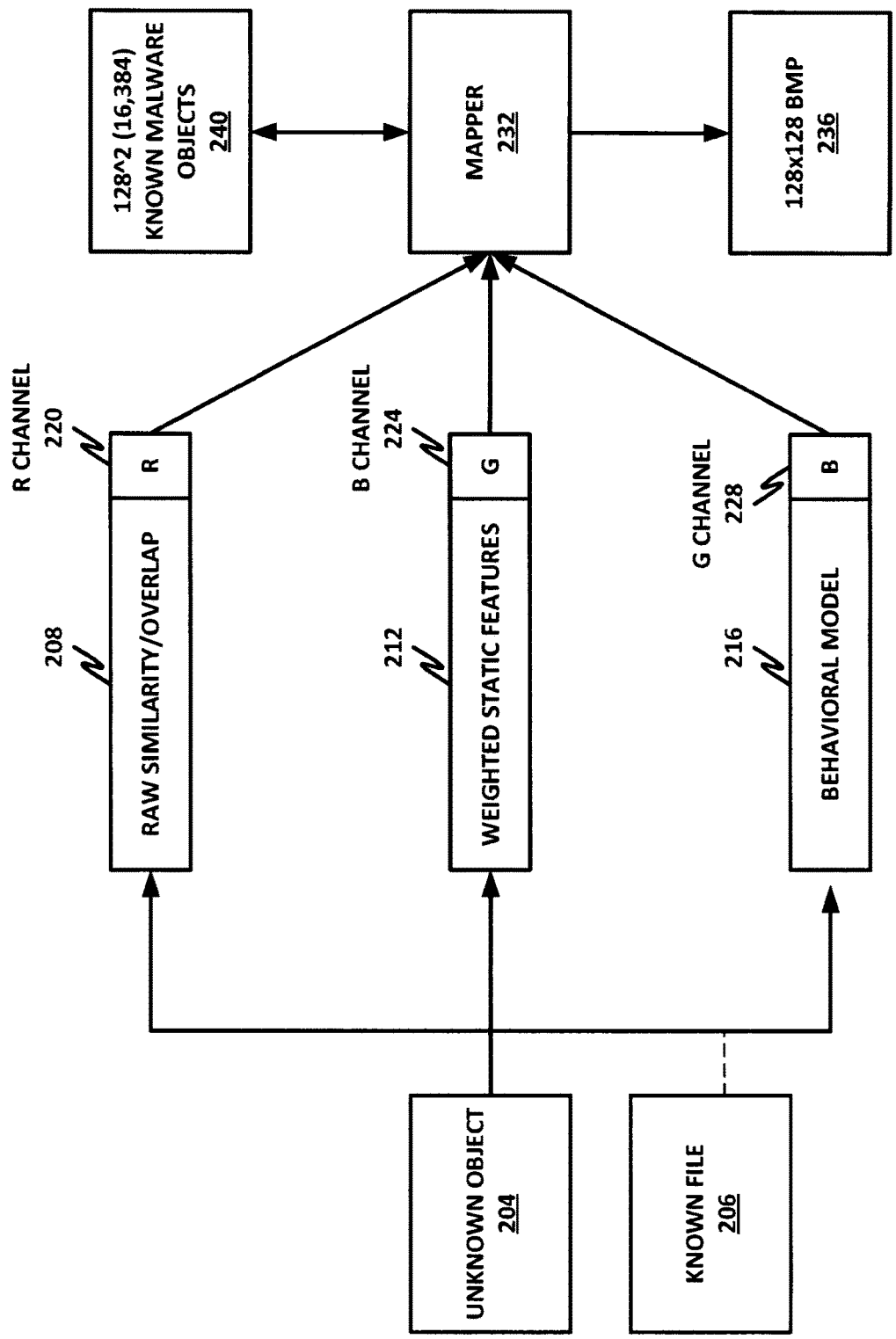
FIG. 2 is a block diagram illustrating an analysis pipeline for an unknown object.

FIG. 2 is a block diagram illustrating an analysis pipeline 200 for an unknown object. Pipeline 200 provides a mechanism for measuring a distance or similarity, according to key performance indicators (KPI), for files to existing known malware or clean files. The analysis may be done from three different perspectives: the code itself, features of the file, and executable behavior. This pipeline provides a convenient mechanism of understanding similarity from the perspective of human or humanlike vision. It provides a means to identify important sections of the encoded image driving the classification.

An operational principle is the establishment of a representation of three similarity measures. These three similarity measures are represented as three color channels in an image, given a defined image size (such as 128×128, or in the more general sense, n) and identifying $128^2$ (or $n^2$) pieces of known malware. Similarity of those files is encoded as pixels in the new image. Stated otherwise, a three-channel variance is computed between the unknown object and each of $n^2$ known malware files. Each of those three-channel variance scores is encoded as a pixel in the resulting bitmap.

Artificial intelligence (AI) and machine learning (ML) have developed models for simulating human vision, and in particular, the human ability to recognize similar images. The encoding described above provides a means of leveraging the high accuracy and widespread availability of these AI and ML models to classify malware. For example, ResNet and ImageNet could be used as examples of computer vision systems that could be applied to the resulting image after being trained on a set of known malware images.

In pipeline 200, unknown object 204 is first encountered in the network, and is selected for analysis by a computer vision malware engine. The computer vision malware engine could be hosted on any suitable hardware platform, including an endpoint device, an HPC cluster, a data center node, a server, an engineering workstation, or any other suitable device. In some examples, the computer vision malware engine may use GPUs or other hardware accelerators to provide aspects of a neural network that provides the computer vision system.

The computer vision model is trained on a set of known malware objects. To provide a comprehensive image, this set may be selected to be at least as large as the square of the number of pixels in each dimension of the object. For example, for an n×n image, the unknown object 204 should be compared to $n^2$ total malware objects. In a more general case, an array of n×m pixels may be provided, in which case at least n×m malware objects may be required.

Analysis pipeline 200 then provides a unified, three-color RGB scale to represent malware similarity. Similarity may be encoded to a standard set of malware and clean files as an image. This may be done by providing mechanisms to measure the similarity of different objects from three different perspectives in the same repository.

For example, block 208 is measure M1, which includes raw code similarity/overlap (e.g., ssdeep). This is encoded as red channel 220. Thus, comparing unknown object 204 to a known object on the basis of raw similarity/overlap will yield an integer value for R channel 220. This integer value may be, for example, a value between 0 and 255 in a standard RGB color scheme. Note that other color schemes use other color models and other color values. The teachings of this specification could be adapted to other color schemes, such as CMYK (Cyan, Magenta, Yellow, Black), HSB (Hue, Saturation, Brightness), and Lab (Luminance, wherein "a" and "b" stand for chrominance), by way of nonlimiting example.

Whatever color scheme is selected, different dimensions of similarity may be encoded as values within that color scheme.

Further in pipeline 200, unknown object 204 is compared on a measure M2. Measure M2 is a weighted static extracted feature set of the file. Thus, static features of unknown object 204 are extracted and compared to static features of known file 206. Many different static features are available. In an embodiment, static features include those listed in Table 1 below, by way of illustrative and nonlimiting example.

TABLE 1

Example Static Features for Malware Samples

| | |
|---|---|
| hex_filesize | The size of the file |
| hex_filelines | The number of rows in the byte view of the file |
| hex_str_len | The number of the corresponding length of string in the file |
| hex_1gram | The number of characters in the file |
| hex_entropy | The file's entropy |
| asm_register | The number of registry keys accessed or modified by the file |
| asm_opcode | The number of opcodes recognized |
| asm_dd | The number of occurrence of the pseudo instruction "dd" |
| asm_dw | The number of occurrence of the pseudo instruction "dw" |
| asm_symbol | The number of special symbols |
| pe_api | The number of suspicious API class |
| pe_dll | The number of dynamic link libraries (DLLs) accessed by the file |
| pe_imports | The number of imports |
| pe_exports | The number of exports |
| pe_mastiff | The information of Mastiff Report |
| pe_alertapi | The statistic number of malicious API |
| pe_compile | The compiling environment of sample |

Known file 206 may be selected from the set of known malware objects 240. The similarity of the weighted static feature set of unknown object 204 and known object 206 is encoded as green channel 224. This yields a green value (e.g., an integer between 0 and 255) for the pixel.

A behavior model of unknown object 204 is then compared to a behavior model of known object 206. The similarity of the two behavior models is then computed as measure M3 of the behavior and process of the file in execution. Measure M3 is then used to compute a value for green channel 228, such as an integer between 0 and 255.

The result is a pixel for a bitmap having an R channel 220 with a red value, a G channel 224 with a green value, and a B channel 228 with a blue value. These three values are used to create a single pixel.

Mapper 232 encodes this pixel with an n×n (or, alternately, an n×m) bitmap array. Mapper 232 maps a single pixel to each comparison between unknown object 204 and an array of known objects 240. Note that known objects 240 may be an array of size n×n or n×m, as appropriate to the embodiment. For example, in a 128×128 bitmap, known objects array 240 includes 16,384 objects. Alternatively, if the image is to be of size 1024×1024, then known objects array 240 may include an array of $1024^2$ objects.

The result is a bitmap 236. In this example, bitmap 236 has a size of 128×128, although any other suitable size may be selected for a particular embodiment. In general, a larger size with higher resolution may yield a more accurate representation of similarity to a large class of malware objects, but at the cost of additional processing time and power.

This solution leverages three measures of similarity at a single time. It takes advantage of the capacity of the human eye (or a computer vision system) to discern similarity and dissimilarity between different objects.

Embodiments also take advantage of AI and ML techniques that are already well-developed, and that already have well-established abilities to recognize similarity between sets of images. This establishes a standardization against a defined standard set of files of defined sizes (e.g., $n^2$ or n×m), designed to span a variety of families and different variants within a family. Note that known malware objects array 240 may include malicious objects, benign objects, and malicious objects of different families or variants within a family.

Figure 3:
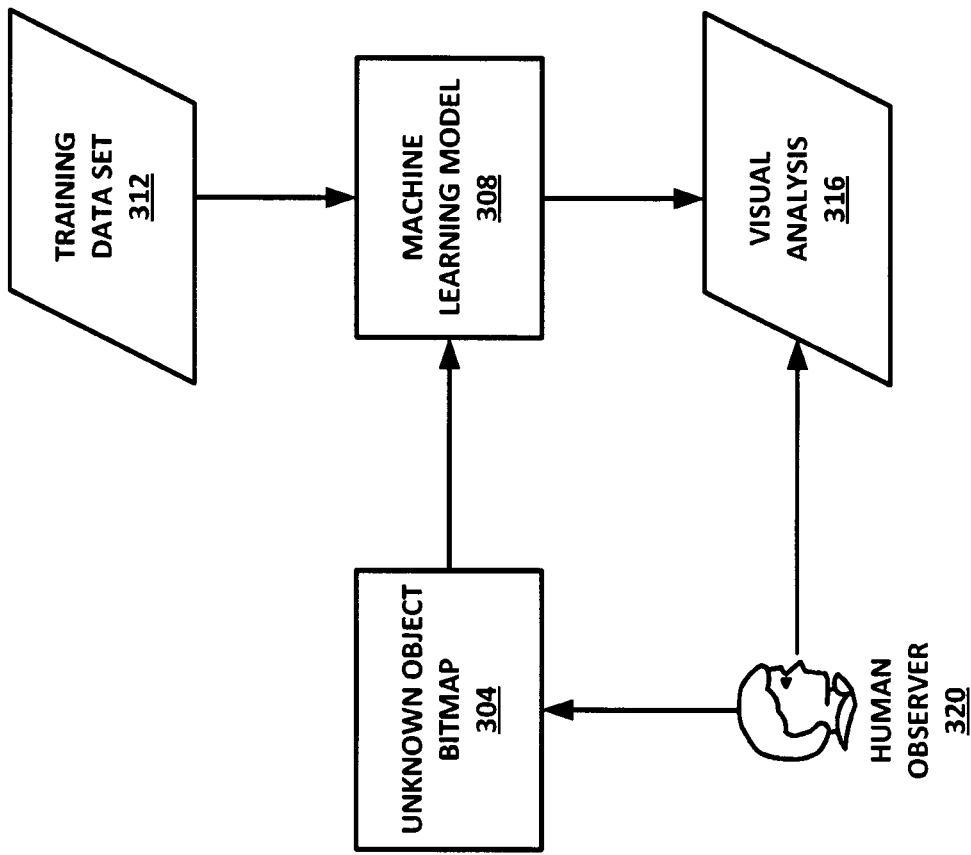
FIG. 3 is a block diagram illustrating a detection pipeline using an unknown object bitmap.

FIG. 3 is a block diagram illustrating a detection pipeline using an unknown object bitmap 304. Unknown object bitmap 304 may be a bitmap including an array of RGB pixels, or other coloring coatings, that compare an unknown object to an array of known objects. In some cases, unknown object bitmap 304 may be an example of output bitmap 236 of FIG. 2. However, unknown object bitmap 304 may be produced in any suitable manner.

In one example, a human observer 320 may be able to observe unknown object bitmap 304 and have a "gut feel" for whether the object is malware. If human observer 320 has observed a large number of malicious and benign files, human observer 320 learns to intuitively recognize patterns that distinguish malicious objects from benign objects. With sufficient training, human observer 320 may also be able to visually identify which regions of output unknown object bitmap 304 represent malware, and thus may be able to determine which family or subfamily of malware the object belongs to, according to the intensity of certain color channels in certain regions. This is particularly useful if an input array (such as known objects array 240 of FIG. 2) is arranged so that known objects are grouped together in different regions of the array.

Thus, a strong "red" showing in one region of the image may indicate that unknown object bitmap 304 represents an object with strong code similarity to a particular family of malware. A strong "green" showing in a particular region may indicate that the unknown object has strong feature similarity to a known object. A strong "blue" showing may indicate that it has strong behavioral similarity to the known object. Furthermore, a strong black or nearly black "splotch" may indicate that the object has strong code, feature, and behavioral similarity to a particular family of malware. In some embodiments, unknown object bitmap 304 may even be presented with either hard or fuzzy boundaries or guidelines that differentiate the various regions that represent different families of objects. Thus, the presence of very light colors in a particular region may indicate weak similarity to that family of objects, while the presence of very dark colors in another region may represent much stronger similarity.

Just as a human security expert can train to recognize these features, a machine learning model can also be trained to recognize these features. For example, a training data set 312 may be provided to a machine learning model 308. Training data set 312 includes images produced according to this method that compare a large number of known malware objects to one another. By learning to spot certain color trends in certain regions of the image, machine learning model 308 may be able to recognize different families and classes of malware. Thus, both machine learning model 308 and human observer 320 can provide a visual analysis 316 of unknown object bitmap 304. This visual analysis can identify whether the object is likely to be malicious, and if it is malicious, can also determine what family of malware it might belong to. This lends to the classification of the file information easily, by both the human eye and by highly-developed, industry standard ML and AI techniques.

Figure 4:
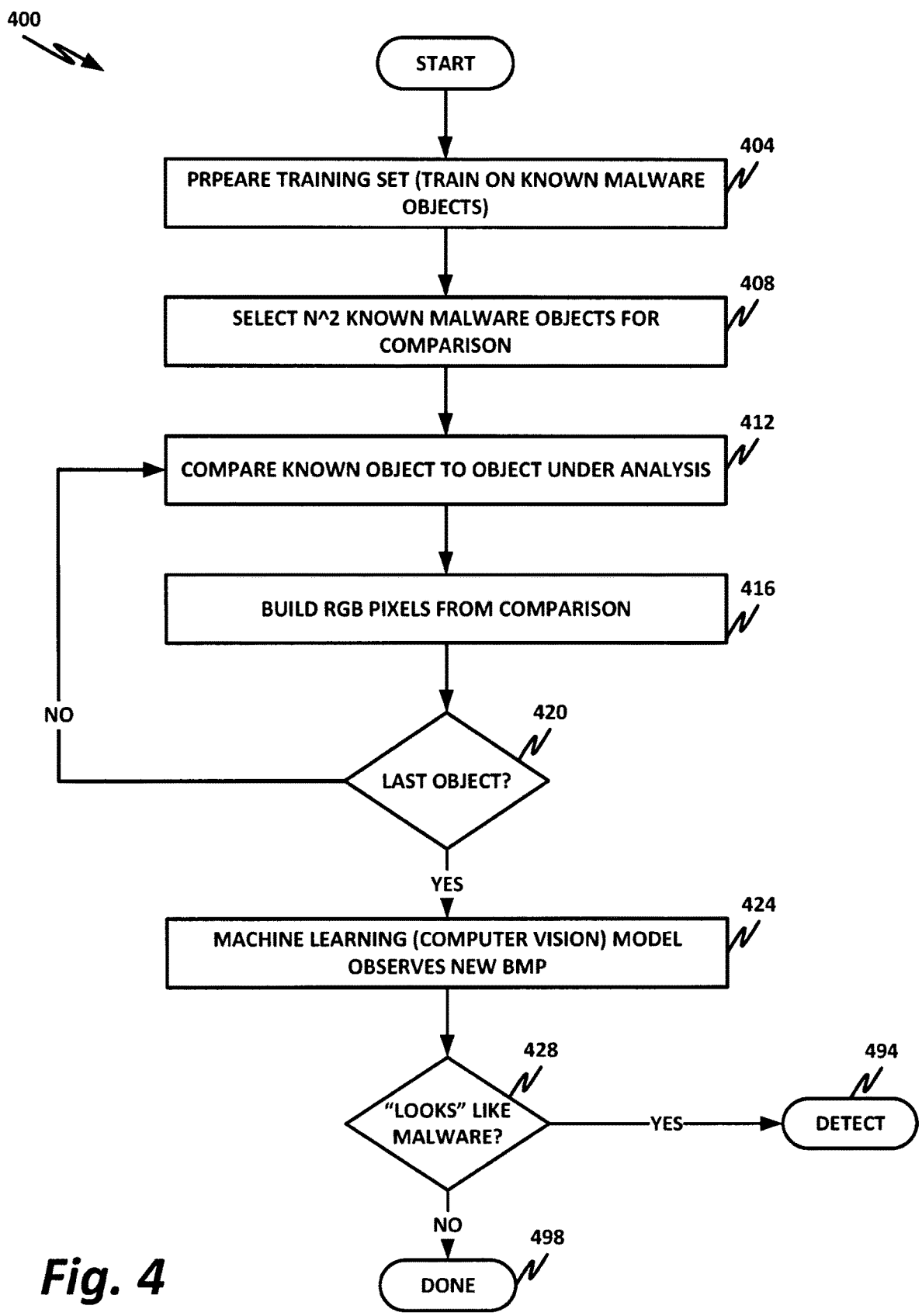
FIG. 4 is a flowchart of a method of detecting an unknown object.

FIG. 4 is a flowchart of a method 400 of detecting an unknown object.

In block 404, a training set is prepared for a machine learning model. This trains the machine learning model on known malware and benign objects, and trains the model to recognize what malicious and benign objects "look" like. Note that a human user can similarly train, by observing images of a large number of malware objects.

In block 408, from a set of available known objects, the model selects $n^2$ known objects for comparison. Note that in selecting the $n^2$ objects, a number of objects from a plurality of families may be selected and grouped together in certain regions of the bitmap. In some cases, a random selection is used in selecting an object from the available objects in a particular family. This helps to ensure that the same objects are not used for comparison in every instance. These $n^2$ known objects can then be mapped to a two-dimensional, three-dimensional, or other-dimensional bitmap index to provide the individual pixels of the bitmap.

In block 412, a known object from among the object set is compared to the object under analysis.

In block 416, a set of RGB pixels is generated from the comparison, with, for example, each pixel representing a similarity. In an illustrative example, the closer a score is to 0, the less similar the objects are, while the closer a score is to 255, the more similar the objects are.

In decision block 420, if this is not the last object for comparison, then control returns back to block 412 for comparison to the next object in the array.

Returning to decision block 420, if the last object has been reached, then a machine learning computer vision model observes the newly generated bitmap.

In block 428, the machine learning model determines whether the image "looks" like malware. If the image is malware, then in block 494, it may be detected as malware, and in block 498, appropriate action may be taken.

Returning to decision block 428, if the object does not look like malware, then no further action may be required. In block 498, the method is done.

Figure 5:
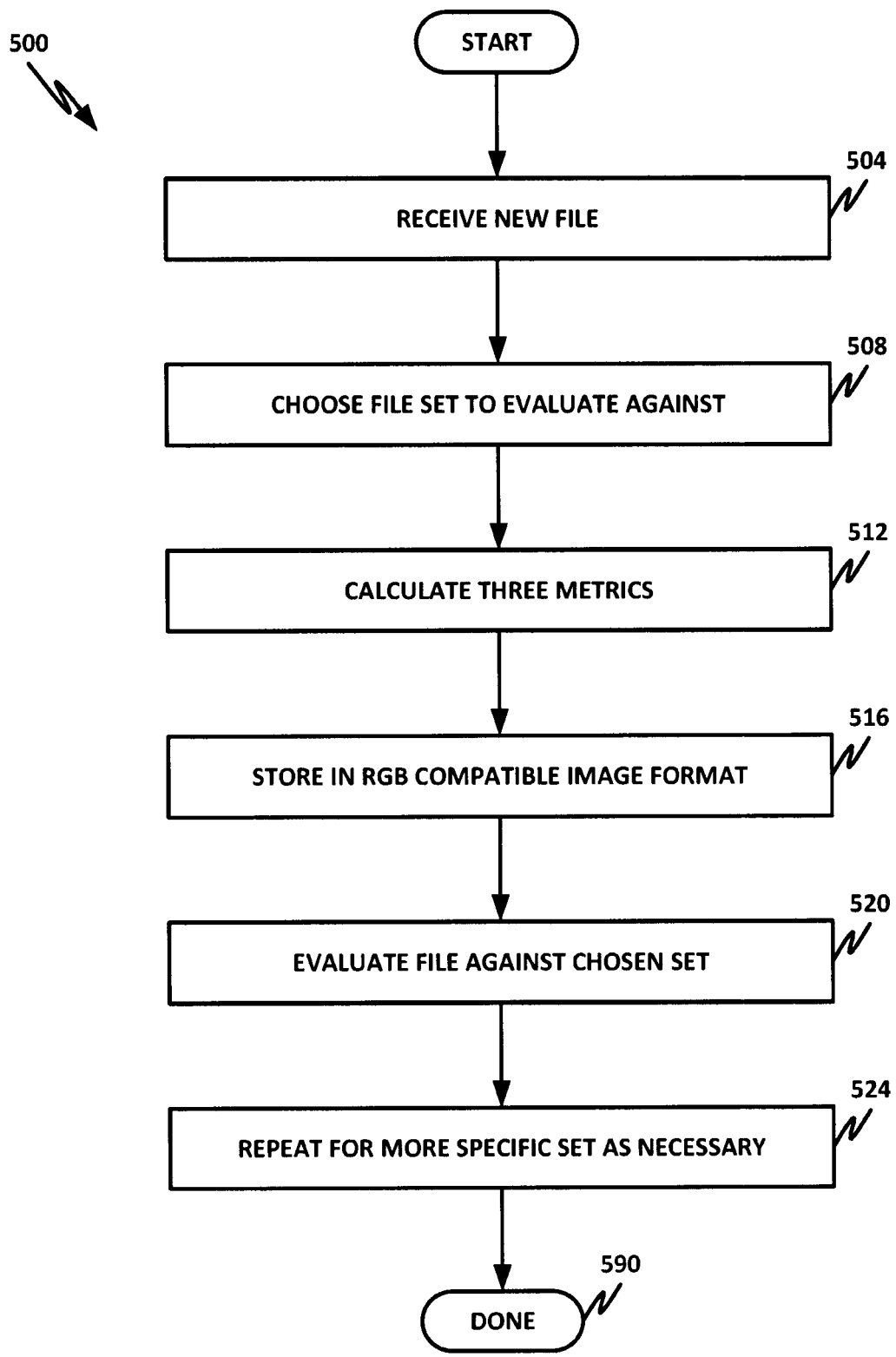
FIG. 5 is a flowchart of a method of performing object analysis.

FIG. 5 is a flowchart of a method 500 of performing object analysis. Although method 500 has some overlap with method 400, method 500 provides a greater focus on some of the mathematical aspects of the malware detection.

Starting in block 504, the model receives a new file to be tested.

At block 508, the model chooses a file set to evaluate against. For example, it may take a standard set D (dirty files) of size $x^2$, where x is the height and width of the image that is to be used. Note that a different set size could be selected, such as $1024^2$, or a more generalized n×m bitmap of a rectangle instead of a square. Note that in choosing a set of baseline files to evaluate the unknown object against, it is possible to select all known malicious files, or to select all known benign files, or to select some mix of the two. Furthermore, in selecting known malicious files, different categories of known malicious files may be selected to provide categorization of the object.

In a more general sense, the technique described herein may be used generically to categorize a file as belonging to any family of files, by comparing it to the features of other known files in the family.

At block 512, the three disclosed metrics are calculated for each object in the known file set, as compared to the new unknown object. For example, a similarity measure M1 is calculated from (A,Xij) for all in D. A similarity measure M2 (A,Xij) is calculated for all in D. Finally, a similarity measure M3 (A,Xij) for all I, j in D is computed.

In block 516, the results are stored as (M1(Xij), (M2(Xij), (M3(Xij) for each ij, where i is the width and j is the height index. This operation may be represented by the following computational matrix:

$$\begin{bmatrix} (M1(X_{11}), M2(X_{11}), M3(X_{11})) & \cdots & (M1(X_{1n}), M2(X_{1n}), M3(X_{1n})) \\ \vdots & \ddots & \vdots \\ (M1(X_{n1}), M2(X_{n1}), M3(X_{n1})) & \cdots & (M1(X_{nn}), M2(X_{nn}), M3(X_{nn})) \end{bmatrix}$$

The object is then stored in an appropriate RGB-compatible image format, or other image format if a different image algorithm is used.

In block 520, the object is evaluated against the chosen set. A human researcher could evaluate the image by eye if he has trained on similar images. An AI could classify, for example, with a convolutional neural network (CNN). In some examples, the CNN could highlight important image sections (i.e., those that are likely to be similar files in a standard set).

In block 524, the process may be repeated for a more specific set if desired. For example, a first pass analysis may be performed with a clean/dirty set, to see if it shows stronger similarity to the clean files or the dirty files. If the object is identified as dirty, then it may be repeated with the broad classes of ransomware, potentially unwanted programs, and Trojans. If the object is found to show a strong similarity to a particular family of malware, then the analysis may be repeated with a set of objects from that family. This may be repeated to any desired level of abstractness to identify how similar the object is to known objects within a certain category.

Figure 6:
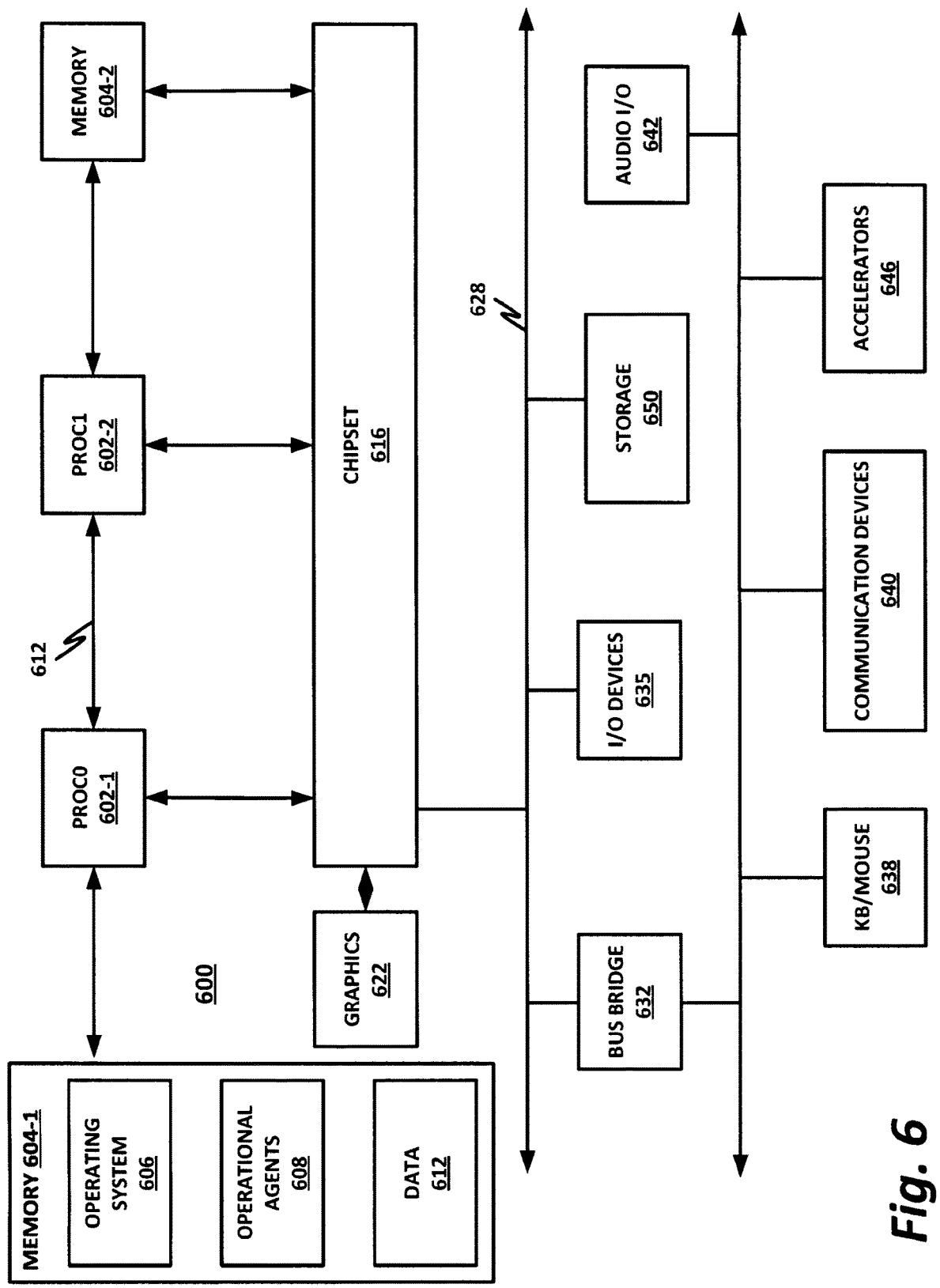
FIG. 6 is a block diagram of selected elements of a hardware platform.

FIG. 6 is a block diagram of a hardware platform 600. Embodiments of hardware platform 600 may be configured or adapted to provide a computer vision malware engine for visual identification of malware, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Figure 8:
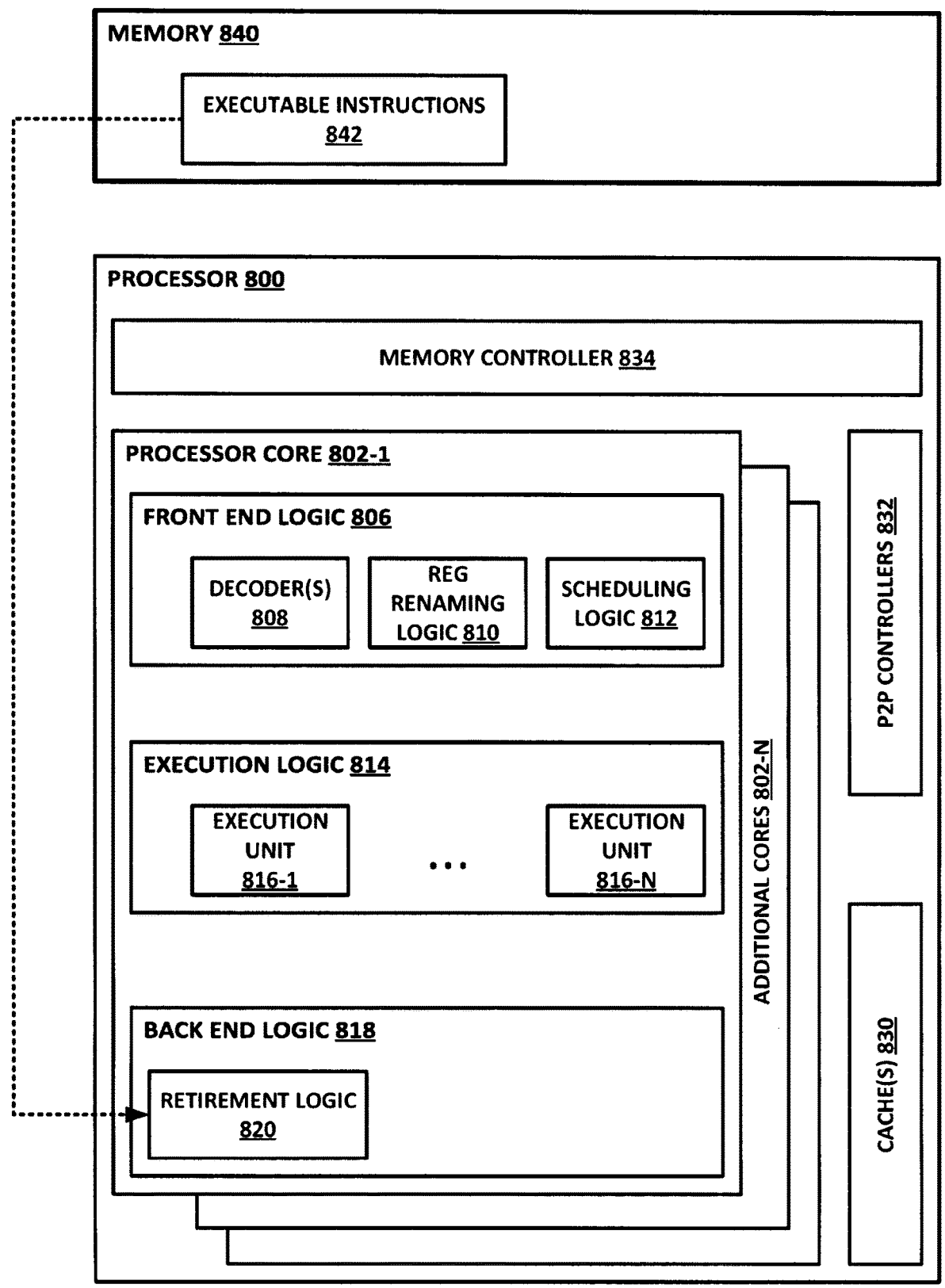
FIG. 8 is a block diagram of selected elements of a processor.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Details of processors 602 are not illustrated in this FIGURE, but one embodiment is illustrated in FIG. 8. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high-performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a processor 602 or on one or more different dies or packages. Each chipset may support any suitable number of processors 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of processors 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a point-to-point interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various USB, FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more nontransitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 7. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), field-programmable gate arrays (FPGAs), and other semiconductor chips.

Figure 7:
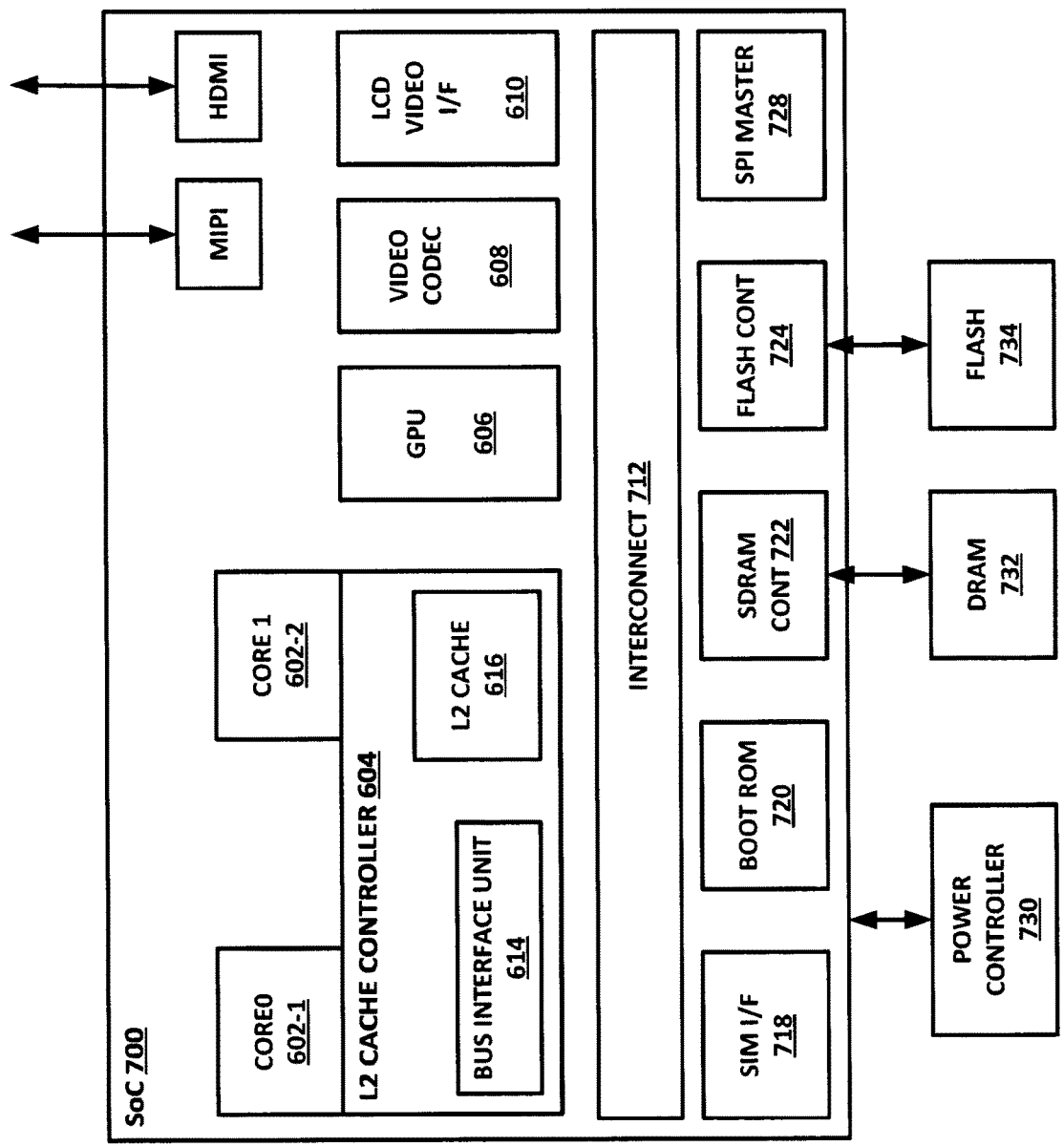
FIG. 7 is a block diagram of selected elements of a system-on-a-chip (SoC).

FIG. 7 is a block illustrating selected elements of an example SoC 700. Embodiments of SoC 700 may be configured or adapted to provide a computer vision malware engine for visual identification of malware, as disclosed in the present specification.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a personal computer, server, video processing components, laptop computer, notebook computer, netbook, or touch-enabled device.

As with hardware platform 600 above, SoC 700 may include multiple cores 702*a* and 702*b*. In this illustrative example, SoC 700 also includes an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

SoC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

Designers of integrated circuits such as SoC 700 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a graphics processing unit (GPU) engine, a security controller, and many other IP blocks. In many cases, each of these IP blocks has its own embedded microcontroller.

FIG. 8 is a block diagram illustrating selected elements of a processor 800. Embodiments of processor 800 may be configured or adapted to provide a computer vision malware engine for visual identification of malware, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, central processor unit (CPU), advanced RISC (reduced instruction-set computing) machine (ARM), digital signal processor (DSP), field-programmable gate array (FPGA), graphics processing unit, programmable logic array, application-specific integrated circuit (ASIC), or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 800 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 800 includes one or more processor cores 802, including core 802-1-802-N. Cores 802 may be, as appropriate, single-thread cores or multi-thread cores. In multi-threaded cores, more than one hardware thread may be provided at a time, and the core may therefore provide more than one logical core per physical core. The cores may be configured to execute instruction code. Each processor 800 may include at least one shared cache 830, which may be treated logically as part of memory 840. Caches 830 may be filled according to known caching techniques, and may store instructions and/or data that may be used by one or more components of processor 800.

Processor 800 may include an integrated memory controller (MC) 834, to communicate with memory 840. Memory controller 834 may include logic and circuitry to interface with memory 840, and may also include a cache controller to handle filling and evicting instructions and data to and from cache 830.

By way of example, each core 802 may include front-end logic 806, execution logic 814, and back-end logic 818.

In the illustrated embodiment, front-end logic 806 includes an instruction decoder or decoders 808, register renaming logic 810, and scheduling logic 812. Decoder 808 may decode instructions received. Register renaming logic 810 may provide register renaming, for example to facilitate pipelining. Scheduling logic 812 may schedule instruction execution, and may provide out-of-order (OOO) execution. Front-end logic 806 may fetch incoming instructions, perform various processing (e.g., caching, decoding, branch predicting, etc.), and pass instructions to execution logic 814.

Execution logic 814 includes one or more execution units 816-1-816-N. Execution units 816 may include hardware instructions and microcode to carry out the provided instructions.

Backend logic 818 includes retirement logic 820. Core 802 may provide for speculative execution of instructions, branch prediction, and similar. Retirement logic 820 may be configured to determine which predicted instructions were actually needed by the program flow.

Processor 800 may also include a PtP controller 832, which enables connection to an uncore, chipset, Northbridge, Southbridge, or bus, by way of example.

Figure 9:
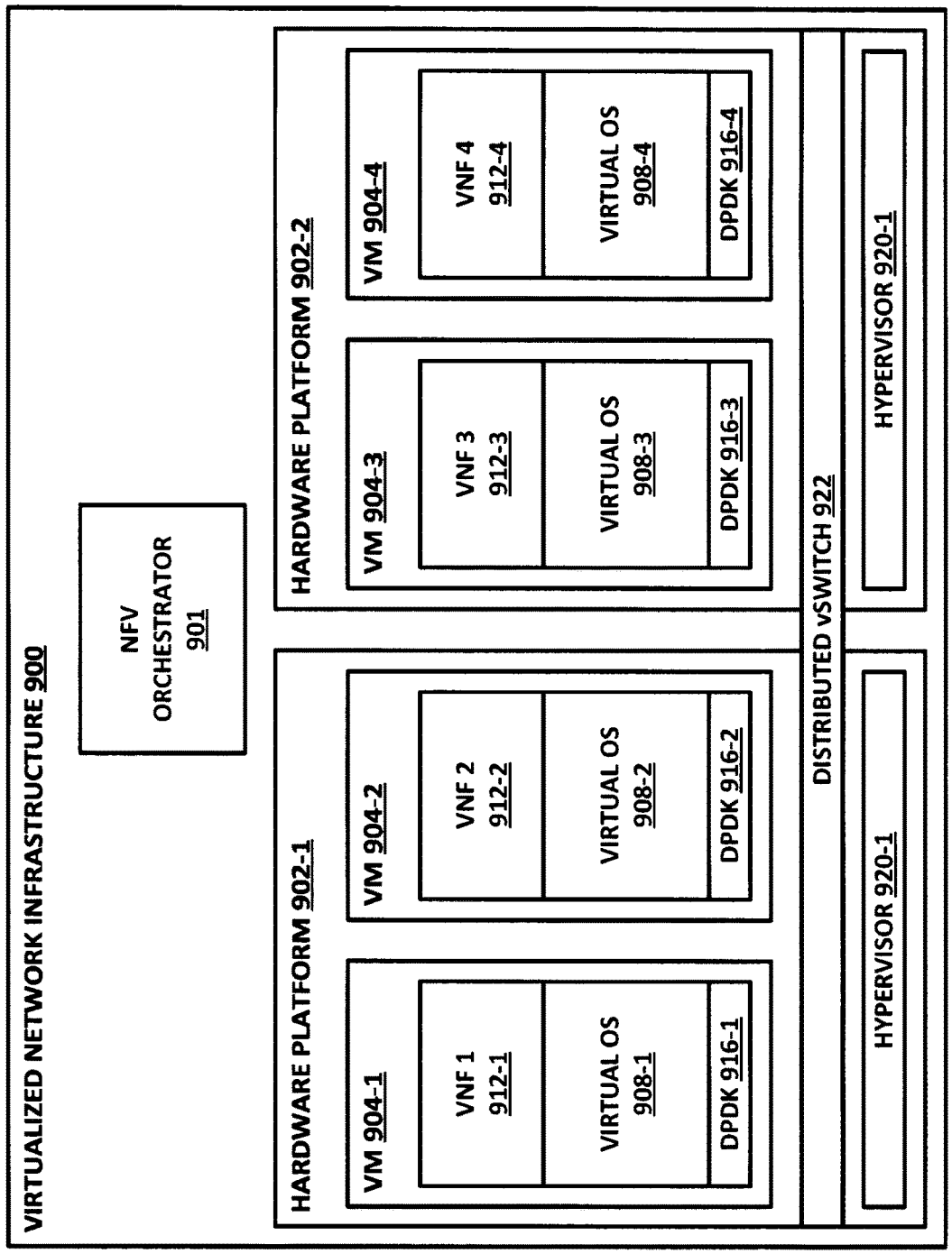
FIG. 9 is a block diagram of selected elements of a network function virtualization (NFV) infrastructure.

FIG. 9 is a block diagram of a network function virtualization (NFV) infrastructure 900. Embodiments of NFV infrastructure 900 may be configured or adapted to provide a computer vision malware engine for visual identification of malware, as disclosed in the present specification.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 900. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) operating system, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK), a virtual operating system 908, and an application providing the VNF 912.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., an HFI). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed.

Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a hardware platform comprising a processor and a memory; and instructions encoded within the memory to instruct the processor to: receive an unknown file object; select the unknown file object for visual analysis; compute first, second, and third property sets for the unknown object; and construct an n×m bitmap of pixels, comprising comparing the unknown file object to n×m known file objects, wherein the pixels include first, second, and third color channels, wherein the first, second, and third color channels represent similarity of the first, second, and third properties to corresponding first, second, and third properties of a known file object from among the n×m file objects.

There is further disclosed an example computing apparatus, wherein the first property set is a raw file similarity property.

There is further disclosed an example computing apparatus, wherein the second property is a static feature set property.

There is further disclosed an example computing apparatus, wherein the third property is an execution behavior property.

There is further disclosed an example computing apparatus, wherein the first, second, and third color channels are red, green, and blue color channels.

There is further disclosed an example computing apparatus, wherein the red, green, and blue color channels have integer values between 0 and 255.

There is further disclosed an example computing apparatus, wherein a value of 0 represents no similarity, a value of 255 represents exact identity, and values between 0 and 255 represent incremental increases in similarity from no similarity to exact identity.

There is further disclosed an example computing apparatus, wherein n=m.

There is further disclosed an example computing apparatus, wherein n=128.

There is further disclosed an example computing apparatus, wherein n=1024.

There is further disclosed an example computing apparatus, wherein the n×m known file objects include only known malware objects.

There is further disclosed an example computing apparatus, wherein the n×m known file objects are grouped into regions by family.

There is further disclosed an example computing apparatus, wherein the instructions are further to visually indicate the regions on the bitmap of pixels.

There is further disclosed an example computing apparatus, wherein the n×m known file objects include a mixture of known benign and malware objects.

There is further disclosed an example computing apparatus, wherein the instructions are to determine similarity at a high level, and then repeat the visual analysis with a new set of known file objects to narrow identification.

There is further disclosed an example computing apparatus, wherein the instructions are further to analyze the bitmap image according to a machine learning computer vision model, and detect the unknown file object as malware if the computer vision model visually identifies the object as malware.

There is also disclosed an example of one or more tangible, non-transitory computer-readable storage media having stored thereon executable instructions to: determine that a file object has an unknown reputation; identify the file object for analysis; receive from a data store 3-tuples of metadata for a total of n×m objects with known reputations; compare three attributes of the file object with the 3-tuples of the n×m objects with known reputation, to yield three scores for each of the n×m comparisons; normalize the three scores for each of the n×m to integer values, to generate an n×m array of integer 3-tuples; map the integer 3-tuples to three color channels of a pixel scheme; and generate a computer image from the mapped integer 3-tuples.

There is further disclosed an example of one or more tangible, non-transitory computer-readable media, wherein the instructions are further to apply a computer vision model to visually identify the file object as malware.

There is further disclosed an example of one or more tangible, non-transitory computer-readable media, wherein the computer vision model is a deep learning model.

There is further disclosed an example of one or more tangible, non-transitory computer-readable media, wherein the three attributes comprise a raw file similarity property.

There is further disclosed an example of one or more tangible, non-transitory computer-readable media, wherein the three attributes comprise a static feature set property.

There is further disclosed an example of one or more tangible, non-transitory computer-readable media, wherein the three attributes comprise an execution behavior property.

There is further disclosed an example of one or more tangible, non-transitory computer-readable media, wherein the three channels are red, green, and blue color channels.

There is further disclosed an example of one or more tangible, non-transitory computer-readable media, wherein the integer values are between 0 and 255.

There is further disclosed an example of one or more tangible, non-transitory computer-readable media, wherein a value of 0 represents no similarity, a value of 255 represents exact identity, and values between 0 and 255 represent incremental increases in similarity from no similarity to exact identity.

There is further disclosed an example of one or more tangible, non-transitory computer-readable media, wherein n=m.

There is further disclosed an example of one or more tangible, non-transitory computer-readable media, wherein n=128.

There is further disclosed an example of one or more tangible, non-transitory computer-readable media, wherein n=1024.

There is further disclosed an example of one or more tangible, non-transitory computer-readable media, wherein the n×m objects with known reputation include only known malware objects.

There is further disclosed an example of one or more tangible, non-transitory computer-readable media, wherein the n×m objects with known reputation are grouped into regions by family.

There is further disclosed an example of one or more tangible, non-transitory computer-readable media, wherein the instructions are further to visually indicate the regions on the computer image.

There is further disclosed an example of one or more tangible, non-transitory computer-readable media, wherein the n×m objects with known reputation include a mixture of known benign and malware objects.

There is further disclosed an example of one or more tangible, non-transitory computer-readable media, wherein the instructions are further to determine gross similarity to a family of objects, and then to repeat the analysis with a subset of objects with known reputation to narrow results.

There is also disclosed an example computer-implemented method of visually detecting malware, comprising: selecting an unknown file for analysis; selecting from a data store a set of k individual records, the individual records comprising 3-tuples of metadata for known files; generating a 3-tuple of metadata for the unknown file; comparing the 3-tuple of metadata for the unknown file with the 3-tuples of metadata for the known files, to yield a set of k 3-tuples of normalized comparison scores, wherein the normalized comparison scores are normalized to integer values corresponding to available values for an image scheme having three channels; using the k 3-tuples of normalized comparison scores to build an image according to the image scheme; and using a computer model to visually analyze the image to visually identify the unknown file as malicious.

There is further disclosed an example method, wherein the computer model is a deep learning computer vision model.

There is further disclosed an example method, wherein the metadata comprise a raw file similarity.

There is further disclosed an example method, wherein the metadata comprise a static feature set.

There is further disclosed an example method, wherein the metadata comprise an execution behavior similarity.

There is further disclosed an example method, wherein the three channels are red, green, and blue color channels.

There is further disclosed an example method, wherein the integer values are between 0 and 255.

There is further disclosed an example method, wherein a value of 0 represents no similarity, a value of 255 represents exact identity, and values between 0 and 255 represent incremental increases in similarity from no similarity to exact identity.

There is further disclosed an example method, wherein $k=128^2$.

There is further disclosed an example method, wherein $k=1024^2$.

There is further disclosed an example method, wherein the k known files include only known malware files.

There is further disclosed an example method, wherein the k known files are grouped into regions by family.

There is further disclosed an example method, further comprising visually indicating the regions on the computer image.

There is further disclosed an example method, wherein the k known files include a mixture of known benign and malware objects.

There is further disclosed an example method, further comprising determining gross similarity to a family of objects, and then the method with a subset of known files to narrow results.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer readable medium comprising instructions that, when executed, implement a method or realize an apparatus as illustrated in a number of the above examples.

What is claimed is:

1. A computing apparatus, comprising:
   a hardware platform comprising a processor and a memory; and
   instructions encoded within the memory to instruct the processor to:
   receive an unknown file object;
   select the unknown file object for visual analysis;
   compute first, second, and third property sets for the unknown object; and
   construct an n×m bitmap of pixels, wherein n and m are positive integers, comprising comparing the unknown file object to n×m known file objects, wherein the pixels include first, second, and third color channels, wherein the first, second, and third color channels represent similarity of the first, second, and third properties to corresponding first, second, and third properties of a known file object from among the n×m file objects.

2. The computing apparatus of claim 1, wherein the first property set is a raw file similarity property.

3. The computing apparatus of claim 1, wherein the second property is a static feature set property.

4. The computing apparatus of claim 1, wherein the third property is an execution behavior property.

5. The computing apparatus of claim 1, wherein the first, second, and third color channels are red, green, and blue color channels.

6. The computing apparatus of claim 5, wherein the red, green, and blue color channels have integer values between 0 and 255.

7. The computing apparatus of claim 6, wherein a value of 0 represents no similarity, a value of 255 represents exact identity, and values between 0 and 255 represent incremental increases in similarity from no similarity to exact identity.

8. The computing apparatus of claim 1, wherein n=m.

9. The computing apparatus of claim 1, wherein the n×m known file objects include only known malware objects.

10. The computing apparatus of claim 9, wherein the n×m known file objects are grouped into regions by family.

11. The computing apparatus of claim 1, wherein the n×m known file objects include a mixture of known benign and malware objects.

12. The computing apparatus of claim 1, wherein the instructions are further to analyze the bitmap image according to a machine learning computer vision model, and detect the unknown file object as malware if the computer vision model visually identifies the object as malware.

13. One or more tangible, non-transitory computer-readable storage media having stored thereon executable instructions to:
determine that a file object has an unknown reputation;
identify the file object for analysis;
receive from a data store 3-tuples of metadata for a total of n×m objects with known reputations, wherein n and m are positive integers;
compare three attributes of the file object with the 3-tuples of the n×m objects with known reputation, to yield three scores for each of the n×m comparisons;
normalize the three scores for each of the n×m to integer values, to generate an n×m array of integer 3-tuples;
map the integer 3-tuples to three color channels of a pixel scheme; and
generate a computer image from the mapped integer 3-tuples.

14. The one or more tangible, non-transitory computer-readable media of claim 13, wherein the instructions are further to apply a computer vision model to visually identify the file object as malware.

15. The one or more tangible, non-transitory computer-readable media of claim 13, wherein the computer vision model is a deep learning model.

16. The one or more tangible, non-transitory computer-readable media of claim 13, wherein the three attributes comprise raw file similarity, static feature set, and execution behavior.

17. The one or more tangible, non-transitory computer-readable media of claim 13, wherein the n×m objects with known reputation are grouped into regions by family.

18. The one or more tangible, non-transitory computer-readable media of claim 17, wherein the instructions are further to visually indicate the regions on the computer image.

19. A computer-implemented method of visually detecting malware, comprising:
selecting an unknown file for analysis;
selecting from a data store a set of k individual records, wherein k is a positive integer, the individual records comprising 3-tuples of metadata for known files;
generating a 3-tuple of metadata for the unknown file;
comparing the 3-tuple of metadata for the unknown file with the 3-tuples of metadata for the known files, to yield a set of k 3-tuples of normalized comparison scores, wherein the normalized comparison scores are normalized to integer values corresponding to available values for an image scheme having three channels;
using the k 3-tuples of normalized comparison scores to build an image according to the image scheme; and
using a computer model to visually analyze the image to visually identify the unknown file as malicious.

20. The method of claim 19, wherein the computer model is a deep learning computer vision model.

* * * * *

UNITED STATES PATENT AND TRADEMARK OFFICE
CERTIFICATE OF CORRECTION

PATENT NO. : 11,461,468 B2
APPLICATION NO. : 16/675352
DATED : October 4, 2022
INVENTOR(S) : Sorcha Bairbre Healy It is certified that error appears in the above-identified patent and that said Letters Patent is hereby corrected as shown below:

In the Drawings

Sheet 2 of 9, in "Fig. 2", Tag "224", delete "B CHANNEL" and insert -- G CHANNEL --, therefor.

Sheet 2 of 9, in "Fig. 2", Tag "228", delete "G CHANNEL" and insert -- B CHANNEL --, therefor.

In the Claims

In Column 26, Claim 14, Line 4, delete "media" and insert -- storage media --, therefor.

In Column 26, Claim 15, Line 8, delete "media" and insert -- storage media --, therefor.

In Column 26, Claim 16, Line 11, delete "media" and insert -- storage media --, therefor.

In Column 26, Claim 17, Line 15, delete "media" and insert -- storage media --, therefor.

In Column 26, Claim 18, Line 18, delete "media" and insert -- storage media --, therefor.

Signed and Sealed this
Twentieth Day of December, 2022

*Katherine Kelly Vidal*
*Director of the United States Patent and Trademark Office*